United States Patent
Takechi et al.

(10) Patent No.: US 9,343,787 B2
(45) Date of Patent: May 17, 2016

(54) LITHIUM-AIR BATTERY WITH SODIUM SALT AS MEDIATOR

(71) Applicant: Toyota Motor Engineering & Manufacturing North America, Inc., Erlanger, KY (US)

(72) Inventors: Kensuke Takechi, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 15 days.

(21) Appl. No.: 14/446,852

(22) Filed: Jul. 30, 2014

(65) Prior Publication Data

US 2016/0036107 A1 Feb. 4, 2016

(51) Int. Cl.

| | |
|---|---|
| *H01M 10/12* | (2006.01) |
| *H01M 6/04* | (2006.01) |
| *H01M 4/36* | (2006.01) |
| *H01M 4/48* | (2010.01) |
| *H01M 6/20* | (2006.01) |
| *H01M 4/13* | (2010.01) |
| *H01M 4/58* | (2010.01) |
| *H01M 2/16* | (2006.01) |

(Continued)

(52) U.S. Cl.
CPC ............ *H01M 12/08* (2013.01); *H01M 2/1646* (2013.01); *H01M 4/134* (2013.01); *H01M 4/96* (2013.01); *H01M 10/052* (2013.01); *H01M 10/0568* (2013.01); *H01M 2004/027* (2013.01); *H01M 2220/20* (2013.01); *H01M 2300/0025* (2013.01)

(58) Field of Classification Search
USPC ............ 429/304, 247, 126, 104, 231.95, 303, 429/405
See application file for complete search history.

(56) References Cited

U.S. PATENT DOCUMENTS

| | | | |
|---|---|---|---|
| 7,491,458 B2 | 2/2009 | Visco et al. | |
| 7,691,536 B2 * | 4/2010 | Johnson | ................ H01M 6/187 429/246 |

(Continued)

FOREIGN PATENT DOCUMENTS

| | | |
|---|---|---|
| WO | WO 2008/133642 A2 | 11/2008 |
| WO | WO 2011/154869 A2 | 12/2011 |

OTHER PUBLICATIONS

U.S. Appl. No. 14/337,432, filed Jul. 22, 2014, Takechi, et al.

*Primary Examiner* — Patrick Ryan
*Assistant Examiner* — Julian Anthony
(74) *Attorney, Agent, or Firm* — Oblon, McClelland, Maier & Neustadt, L.L.P.

(57) ABSTRACT

A lithium air battery is provided. The battery comprises: an anode compartment; a cathode compartment supplied with an $O_2$ source; and a lithium ion conductive membrane separating the anode compartment from the cathode compartment. The anode compartment comprises an anode having lithium or a lithium alloy as active metal and a lithium ion electrolyte, while the cathode compartment comprises an air electrode and a sodium ion electrolyte. The anode compartment is separated from the cathode compartment by a lithium ion conductive membrane that is not permeable to sodium ions. In a preferred embodiment the cathode compartment contains an ionic liquid.

18 Claims, 3 Drawing Sheets

(51) Int. Cl.
  *H01M 6/14* (2006.01)
  *H01M 10/0562* (2010.01)
  *H01M 6/18* (2006.01)
  *H01M 8/22* (2006.01)
  *H01M 12/08* (2006.01)
  *H01M 4/134* (2010.01)
  *H01M 4/96* (2006.01)
  *H01M 10/052* (2010.01)
  *H01M 10/0568* (2010.01)
  *H01M 4/02* (2006.01)

(56) References Cited

U.S. PATENT DOCUMENTS

| | | |
|---|---|---|
| 8,455,131 B2 | 6/2013 | Visco et al. |
| 2012/0028137 A1 | 2/2012 | Chase et al. |
| 2013/0045428 A1 | 2/2013 | Visco et al. |
| 2013/0202974 A1* | 8/2013 | Mizuno .......... H01M 4/86 429/405 |
| 2013/0316253 A1 | 11/2013 | Barde et al. |
| 2014/0075745 A1 | 3/2014 | Lu et al. |

* cited by examiner

LITHIUM-AIR BATTERY WITH SODIUM SALT AS MEDIATOR

BACKGROUND OF THE INVENTION

The present invention is directed to a lithium-air battery having high capacity and recycle efficiency.

Lithium ion technology has dominated the market as an energy source for small electronic devices and even hybrid electric vehicles. However, Li-ion batteries have insufficient theoretical capacity to be a power source for future high capacity generations of power sources capable to run an electric vehicle.

Metal-air batteries have been under investigation as advanced generation of high capacity energy sources that have the potential to power vehicular devices for distances comparable to present hydrocarbon based combustion engines. In a metal-air battery, the metal of the anode is oxidized and the resulting cation travels to the cathode zone containing a porous matrix of a material such as carbon, for example, where oxygen is reduced and the reduction product as oxide or peroxide combines with the metal cation to form the discharge product. Upon charge, this process is ideally reversed. Metal-air batteries are recognized to have potential advantageous properties over metal ion batteries because the cathodic material, oxygen, may be obtained from the environmental air atmosphere and thus the capacity of the battery would in theory be limited by the anodic metal supply. Thus, oxygen gas would be supplied continuously from outside the battery and battery capacity and voltage would be dependent upon the oxygen reducing properties and chemical nature of the discharge product formed.

Lithium air batteries have the potential to supply 5-10 times greater energy density than conventional lithium ion batteries and have attracted much interest and development attention as a post lithium ion battery technology. For example, a nonaqueous lithium air battery which forms $Li_2O_2$ as discharge product theoretically would provide 3038 Wh/kg in comparison to 600 Wh/kg for a lithium ion battery having a cathodic product of $Li_{0.5}CoO_2$. However, in practice, the metal air technology and specifically current nonaqueous lithium air batteries suffer many technical problems which have prevented achievement of the theoretical capacity.

The capacity of the Li air battery is highly dependent upon the capacity of the cathode matrix to store the $Li_2O_2$ discharge product. $Li_2O_2$ is generally insoluble in conventional non-aqueous solvents employed in metal air batteries. Therefore, upon formation at the cathode matrix the $Li_2O_2$ precipitates and fills the surface porosity of the matrix thus preventing access to the vacant capacity of the matrix interior region. Moreover, $Li_2O_2$ is an insulator and therefore, once the surface of the matrix is coated, oxygen reduction is prevented and discharge terminated, i.e., the capacity of the battery is severely reduced in comparison to the theoretical capacity.

As indicated above, effort to produce an efficient high capacity lithium air battery has received much attention.

Gordon et al. (WO 2008/133642) describe a metal (Li, Na, K) air battery having a metal anode, an ion selective membrane separating the anode from the cathode and forming distinct compartments for each electrode. The catholyte is aqueous and the metal hydroxide or metal peroxide formed at the cathode is retained as a solute in the aqueous catholyte.

Hartmann et al. (Nature Materials, Vol. 12, March, 2013, 228-232) describe construction of an electrochemical cell having a sodium anode and glass fiber air cathode. The electrolyte was diethylene glycol dimethyl ether with sodium triflate as solute. The cell was compared to a similarly constructed lithium electrochemical cell and the authors concluded that a sodium air battery may have properties which are advantageous over a lithium air battery.

Peled et al. (WO 2011/154869) describe a metal air battery wherein the metal anode is employed in a molten state. The molten anode is separated from the catholyte by a Solid Electrolyte Interphase (SEI) film. Multiple metals including sodium, lithium, potassium, rubidium, cesium and alloys thereof are described and sodium appears to be the preferred embodiment.

Lu et al. (U.S. 2014/0075745) describe a alkali/oxidant battery having an anode of an alkali metal including lithium, sodium and potassium, a separator of an ion permeable membrane and a cathode of NiOOH, $Mn^{+4}O_2$ or $Fe^{+3}(OH)_3$. The anolyte ion is the cation of the anode metal and the catholyte contains both the cathode active material and the alkali metal hydroxide.

Barde et al. (U.S. 2013/0316253) describes a method to prepare an oxygen cathode by forming a catalytic material on a surface of a carbonaceous substrate. $\alpha\text{-}MnO_2$ is an example of the catalytic material formed on the carbon. A lithium air cell containing the cathode material is described. The cell does not contain an ion specific permeable membrane and the electrolyte active ion is $Li^+$ throughout the cell.

Visco et al. (U.S. 2013/0045428) describes an aqueous lithium air battery wherein the lithium anode is protected from the aqueous catholyte by a lithium ion conductive membrane. Lithium salts are present in the catholyte along with an organic acid having acidity of sufficient strength to dissolve lithium carbonate.

Chase et al. (U.S. 2012/0028137) describe a metal air electrochemical cell wherein the electrolyte contains an "oxygen evolving catalyst" (OEC). Convention cell structure is employed and the OEC on charging catalyzes the oxidation of metal oxides in the air electrode and electrolyte.

Visco et al. (U.S. Pat. No. 8,455,131) describe a lithium air cell having a lithium anode protected by a lithium ion conductive membrane in communication with an aqueous catholyte air cathode. The catholyte contains a halide salt in addition to a lithium salt such that the humidity of the cathode compartment is controlled. A sodium halide is not disclosed as a halide salt and an anode compartment containing a lithium anolyte separated from the cathode compartment by a lithium ion conducting membrane is not disclosed.

Visco et al. (U.S. Pat. No. 7,491,458) describe a lithium fuel cell wherein the anode is protected from the electrolyte by a lithium ion conductive membrane. This reference does not disclose or suggest a lithium air battery having a structure according to the present invention.

In spite of the significant ongoing effort there remains a need to develop and produce an efficient, safe, cost effective, high capacity lithium air battery useful especially for powering vehicles to distances at least equal to or competitive with current hydrocarbon fuel systems.

SUMMARY OF THE INVENTION

This and other objects are addressed by the present invention, the first embodiment of which includes a lithium-air battery, comprising:

an anode compartment;
a cathode compartment; and
a lithium ion conductive membrane separating the anode compartment from the cathode compartment; wherein
the anode compartment comprises an anode having lithium or a lithium alloy as active metal and a lithium ion electrolyte, the cathode compartment comprises an air electrode and a sodium ion electrolyte, and the lithium ion conductive membrane is not permeable to sodium ions.

In one specific aspect of the first embodiment, the cathode compartment comprises an ionic liquid.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Figure 1:
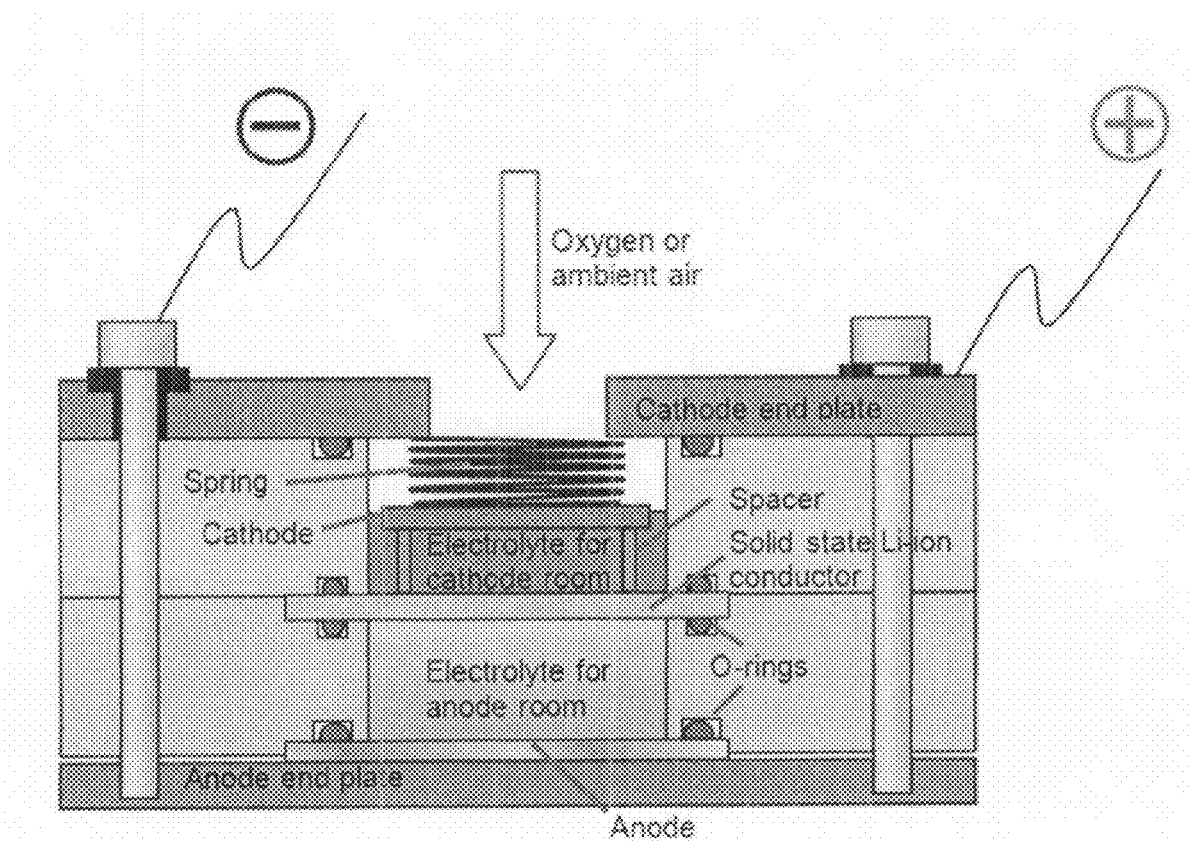
FIG. 1 shows a schematic diagram of a lithium air battery according to one embodiment of the present invention.

Throughout this description all ranges described include all values and sub-ranges therein, unless otherwise specified. Additionally, the indefinite article "a" or "an" carries the meaning of "one or more" throughout the description, unless otherwise specified.

According to the present invention the term "vehicle" means any power driven device designed for transportation including an automobile, truck van, bus, golf cart and other utility forms of transportation.

Throughout this description, the terms air, oxygen and $O_2$ as cathode material may be used interchangeably unless specifically limited. One of ordinary skill will understand that $O_2$ is the redox active cathode ingredient and whether described as air, oxygen or $O_2$, the meaning is understood. In certain description air of pure $O_2$ may be described as the source of the cathode ingredient.

The present inventors are conducting a broad and detailed study of post-lithium ion battery technologies seeking to identify and develop new and improved energy supply systems having capacity and voltage suited to specific uses. Metal-gas batteries having high capacity and high working potential are ongoing targets of such study and in this ongoing study the inventors have discovered a new and novel lithium air battery which addresses and overcomes many of the problems associated with conventionally known lithium air batteries.

Therefore, the first embodiment of the present invention is a lithium-air battery, comprising:

an anode compartment;

a cathode compartment; and a lithium ion conductive membrane separating the anode compartment from the cathode compartment; wherein the anode compartment comprises an anode having lithium or a lithium alloy as active metal and a lithium ion electrolyte, the cathode compartment comprises an air electrode and a sodium ion electrolyte, and the lithium ion conductive membrane is not permeable to sodium ions.

According to the battery structure of the present invention, the rechargeable property of a sodium air battery is combined with the capacity of the lithium air battery. $NaO_2$ formed at the cathode during discharge reaction forms large crystalline particle structure and gives higher capacity than Li-air battery because of relatively continuous reaction as compared with Li-air. However, since Li metal is used as an anode the safety issue due to the extensive reactivity of the Na metal is avoided by the structure of the present invention.

According to the new lithium air battery structure of the present invention, high capacity (long time operation) is obtained as shown in the results of the Examples. The advantages obtained with the structure of the present invention in comparison to a sodium air battery include:

No need to use Na metal as anode, thus avoiding safety issues associated with sodium metal.

Voltage increase roughly by 0.3 V compared with a Na-air battery system.

Air exposure; the structure of the present invention enables exposure of the battery to ambient air as an oxygen source because the solid lithium electrolyte membrane protects the highly reactive Li metal of the anode. Alternatively, the oxygen source may be pure $O_2$ or a mixture of $O_2$ and a gas that is inert to reduction at the cathode.

Not wanting to be constrained by theory, the inventors believe that the Na salt acts as supporting salt and as a mediator as exemplified by the following reactions:

$$NaTFSI + O_2^- = NaO_2 + TFSI^-$$

$$TFSI^- + Li^+ = LiTFSI$$

$$NaO_2 + LiTFSI = LiO_2 + NaTFSI$$

$$LiO_2 = \tfrac{1}{2}Li_2O_2 + \tfrac{1}{2}O_2$$

In one embodiment of the present invention the cathode compartment comprises an ionic liquid. Suitable ionic liquids may comprise any of cations such as imidazolium cation, piperidinium cation, pyrrolidinium cation and ammonium cation and any of anions such as bis(trifluoromethansulfonyl)imide anion, bis(fluorosulfonyl)imide anion, tetrafluoroborate anion and hexafluorophosphate anion. In preferred embodiments the ionic liquid may be N-methyl-N-propylpiperidinium bis(trifluoromethansulfonyl)imide (PP13TFSI) or N,N-diethyl-N-methyl-N-(2-methoxyethyl)ammonium bis(trefluoromethansulfonyl)imid (DEMETFSI). Thus, an ionic liquid with high tolerance, i.e., chemical resistance to degradation, against $O_2$ radical is used. Also, the electrolyte system of the present invention allows for exposure of the cathode to air as an oxygen source because the ionic liquid is not volatile and therefore electrolyte loss during the battery operation is not a problem.

Further, a salt that enhances the performance of the ionic liquid may be added to the cathode compartment. Such salt must be soluble in the ionic liquid and may serve to stabilize reduced $O_2$ radicals obtained at the cathode without forming solid precipitates which would congest the cathode matrix. Suitable salts that may be added to the cathode compartment include salts of organic cations compatible with an ionic liquid. Examples of such salts include tetraalkyl ammonium salts, imidazolium salts, pyridinium salts and piperidinium salts. In one embodiment, an additive salt may be tetrabutyl ammonium (TBA) bis(trifluoromethylsulfonyl)amide (TFSA).

Also, the electrolyte system of the present invention allows for exposure of the cathode to air as an oxygen source because the ionic liquid is not volatile and therefore electrolyte loss during the battery operation is not a problem.

Moreover, since $NaO_2$ is partially soluble in the ionic liquid, the precipitation and pore clogging associated with formation of $Li_2O_2$ is prevented, resulting in a continuous discharge reaction and thus surprisingly significantly longer battery operation. In contrast, if a Li electrolyte were used instead of the Na electrolyte, $Li_2O_2$ passivation would happen as mentioned above and the discharge reaction would be stopped.

The purpose of the lithium ion conductive membrane is to allow reversible passage of lithium ions (Li+) from the anode compartment to the cathode compartment, while preventing other cations, especially sodium cations (Na+) from entering the anode compartment. The membrane may be constructed of a polymer, a ceramic or a composite thereof. To reduce any detrimental effect of gas on performance of the anode, an effective membrane will be fully impermeable or substantially impermeable to gas, thus preventing gas admitted to the cathode compartment from entrance to the anode compartment. A preferable partition may be a dense ceramic membrane. For example, the partition may be a lithium-ion conducting ceramics plate such as Li—La—Ti—O based perovskite, a Li—Al—Ti—P—O based NASICON, a Li—La—Zr—O based garnet, a Li—P—S based solid electrolyte and a Li—Ge—P—S based solid electrolyte.

The use of solid state conductor also gives a capability of the introduction of the ambient air because it prevents moisture and carbon dioxide coming from the air from approaching the anode to deactivate it.

Furthermore, regarding rechargeability, the use of the Na ion in cathode compartment increases the efficiency of the electrochemical decomposition capability, which gives higher cycleability of the battery. Regarding rate capability and capacity, use of the Na ion in cathode side increases the electrochemical active site of the cathode to give higher current density and larger discharge product growth, which provides higher capacity.

The positive electrode may be of a porous unit construction and may further comprise an oxidation reduction catalyst, a conductive material and a binder. The cathode may be constructed by mixing the redox catalyst, conductive material and optionally the binder and applying the mixture to a current collector of appropriate shape. The oxidation reduction catalyst may be any material which promotes the $O_2$ redox reaction.

Examples of an $O_2$ redox catalyst may include but are not limited to an alkali or alkali earth metal in the form of its oxide ($Li_2O$, $Na_2O$, $K_2O$, MgO, CaO, SrO, BaO), hydroxide (LiOH, NaOH, KOH, $Mg(OH)_2$, $Ca(OH)_2$, $Sr(OH)_2$, $Ba(OH)_2$), carbonate ($Li_2CO_3$, $Na_2CO_3$, $K_2CO_3$, $MgCO_3$, $CaCO_3$, $SrCO_3$, $BaCO_3$), or any combination thereof. The active component is typically impregnated on a high surface area oxide support such as $Al_2O_3$, $ZrO_2$, $TiO_2$, $CeO_2$, or any mixed oxide thereof. A precious metal such as Pt, Pd, Rh, or any combination thereof may be present in the catalyst. The positive electrode may contain an electrically-conductive material which is chemically stable in the potential window of use of the cell.

Preferably the conductive material is porous and has a large specific surface area to provide high output. An example of such material may include but is not limited to a carbonaceous material such as Ketjen black, acetylene black, vapor grown carbon fiber, graphene, natural graphite, artificial graphite and activated carbon. Other suitable conductive materials may be conductive fibers, such as a metal fiber, metal powder, such as nickel and aluminum, and organic conductive materials, such as a polyphenylene derivative. In some embodiments mixtures of these materials may be employed. Other suitable conductive materials may be conductive ceramics such as titanium nitride and titanium carbide.

Suitable binders known to one of ordinary skill which are chemically stable in the potential window of use of the cell may include thermoplastics and thermosetting resins. For example, polyethylene, polypropylene, polytetrafluoroethylene (PTFE), Polyvinylidene fluoride (PVDF), styrene butadiene rubber, a tetrafluoroethylene hexafluoro ethylenic copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE) and an ethylene-acrylic acid copolymer. These binders may be used independently, or mixtures may be used.

The components may be wet blended in the presence of a suitable solvent or dry blended using a mortar or other conventionally known mixing equipment. The mixture may then be applied to a charge collector by conventionally known methods. Any suitable charge collector may be employed. Preferred charge collectors may be any of carbon, stainless steel, nickel, aluminum and copper. In order to assist diffusion of the air, it may be preferable that the collector is a porous body, such as mesh. In certain embodiments the charge collector may comprise a protective coating of an oxidation-resistant metal or alloy to protect the collector from oxidation.

Due to the presence of the lithium conducting membrane the battery is divided into an anode compartment and a cathode compartment. The lithium electrolyte ion or mobile ion carrier may be any conventionally known to one of skill in the art and may include one or more of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

The sodium electrolyte of the cathode department may be any conventionally known sodium salt that is stable to superoxide ion. For example, the sodium electrolyte may be $Na_2SO_4$, $NaNO_3$, $NaClO_4$, $Na_3PO_4$, $Na_2CO_3$, $NaPF_6$ and NaOH; sodium salts such as $NaPF_6$ or $NaClO_4$ may be preferred in certain embodiments.

The metal of the anode may comprise any of lithium or a lithium alloy.

Herein the system of the anode compartment may be referenced as the anolyte while the system of the cathode compartment may be referenced as the catholyte.

Nonaqueous solvents suitable for the anode compartment include cyclic carbonates, chain carbonates, cyclic esters, cyclic ethers and chain ethers. Examples of a cyclic carbonate include ethylene carbonate, propylene carbonate, butylene carbonate and vinylene carbonate. Examples of a chain carbonate include dimethyl carbonate, diethyl carbonate and methyl ethyl carbonate. Examples of a cyclic ester carbonate include gamma butyrolactone and gamma valerolactone. Examples of a cyclic ether include tetrahydrofuran and 2-methyltetrahydrofuran. Examples of a chain ether include dimethoxyethane and ethyleneglycol dimethyl ether. In some preferred embodiments the solvent may be a nitrile system solvent such as acetonitrile or an ionic liquid.

An example of a lithium air battery according to the present invention is schematically shown in FIG. 1. In FIG. 1 the membrane is labeled as solid state Li-ion conductor and the cathode compartment contains the liquid electrolyte and the cathode while the anode compartment contains the electrolyte and the lithium anode. The cell is housed in a container which is charged with oxygen or ambient air. The gas enters the cathode compartment through the opening of the cathode end plate.

Having generally described this invention, a further understanding can be obtained by reference to certain specific examples which are provided herein for purposes of illustration only and are not intended to be limiting unless otherwise specified.

EXAMPLE

A sodium ion mediated lithium-air battery was constructed according to the structure schematically shown in FIG. 1 according to each system described below.

Basic (Common) Setup and Condition for Example and Comparative Example Experiments Cathode: Carbon paper (TGP-H-120, Toray Industry)

Solid state Li-ion conductor (separator): 1 mm of thickness of LATP based solid state Li-ion conductor, LIC-GC (OHARA glass)

Electrolyte for anode room: 1.0 mol/L LiTFSA*[1] (Kishida Chemical) in propylene carbonate (Kishida chemical)

*1: TFSA=bis(trifluoromethylsulfonyl)amide anion

Anode: 0.25 mm of thickness of Li metal (FMC corp.)

Evaluation temp.: 25 deg C

Example 1

Electrolyte for cathode compartment: 0.352 mol/kg NaTFSA (Kishida chemical) in DEME*[2]-TFSA (Kanto corp.)

*2: DEME=N,N-diethyl-N-methyl-N-(2-methoxyethyl)ammonium cation

Introduced gas: Pure oxygen (1.2 atm, closed condition)

Example 2

Electrolyte for cathode compartment: 0.352 mol/kg NaTFSA (Kishida chemical) in DEME*[2]-TFSA (Kanto corp.) Introduced gas: Ambient air (opened condition)

Comparative Example 1

Electrolyte for cathode compartment: 0.352 mol/kg LiTFSA in DEME-TFSA Introduced gas: Pure oxygen (1.2 atm, closed condition)

Comparative Example 2

Electrolyte for cathode compartment: 0.352 mol/kg LiTFSA in DEME-TFSA

Introduced gas: Ambient air (opened condition)

Figure 2:
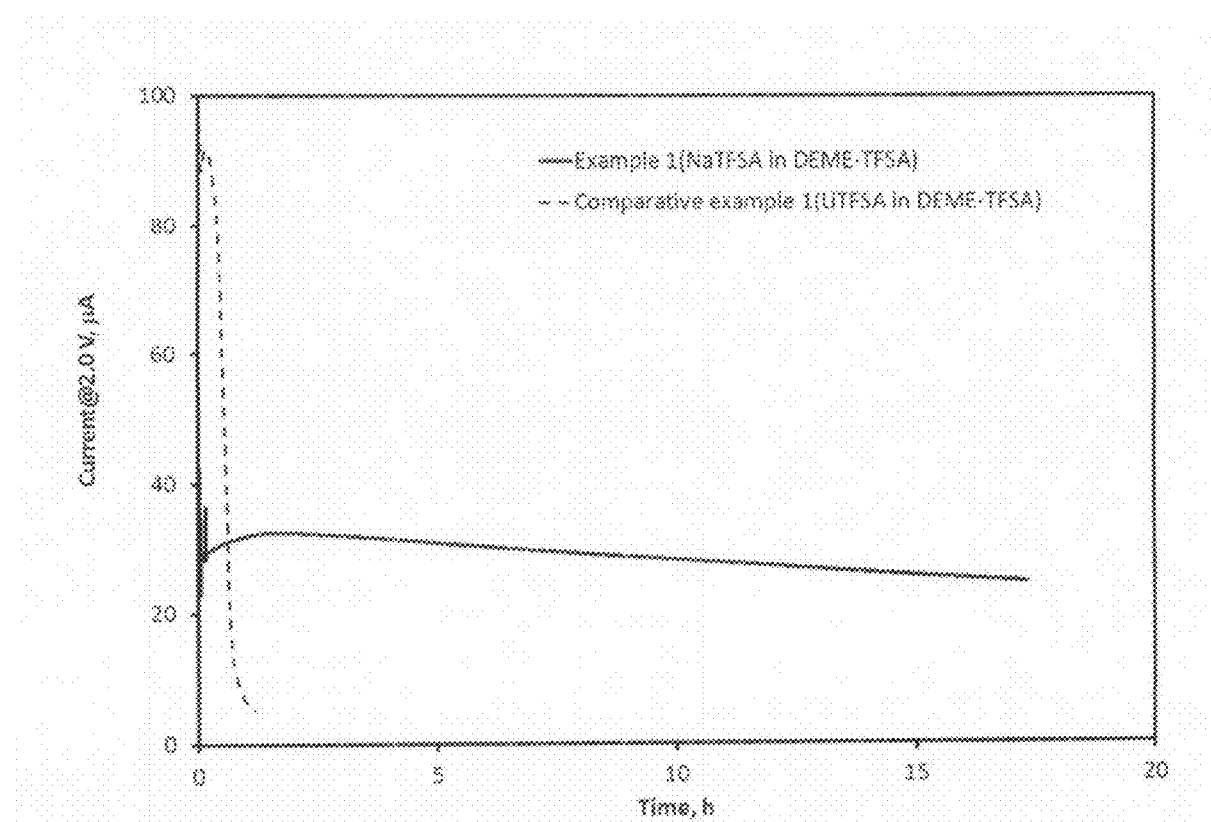
FIG. 2 shows the Discharge curves of Example 1 and Comparative example 1 (closed $O_2$ supply).

FIG. 2 shows the Discharge curves of Example 1 and Comparative example 1 (closed $O_2$ supply) that were obtained.

The discharge ran at constant current and constant voltage (CC-CV) mode with 100 mA up to the offset potential of 2.0 V vs. Li and the cut-off current of 5 mA. This figure showed clear evidence that Example 1 has larger capacity and rate capability than Comparative example 1 in closed $O_2$ supply condition.

Figure 3:
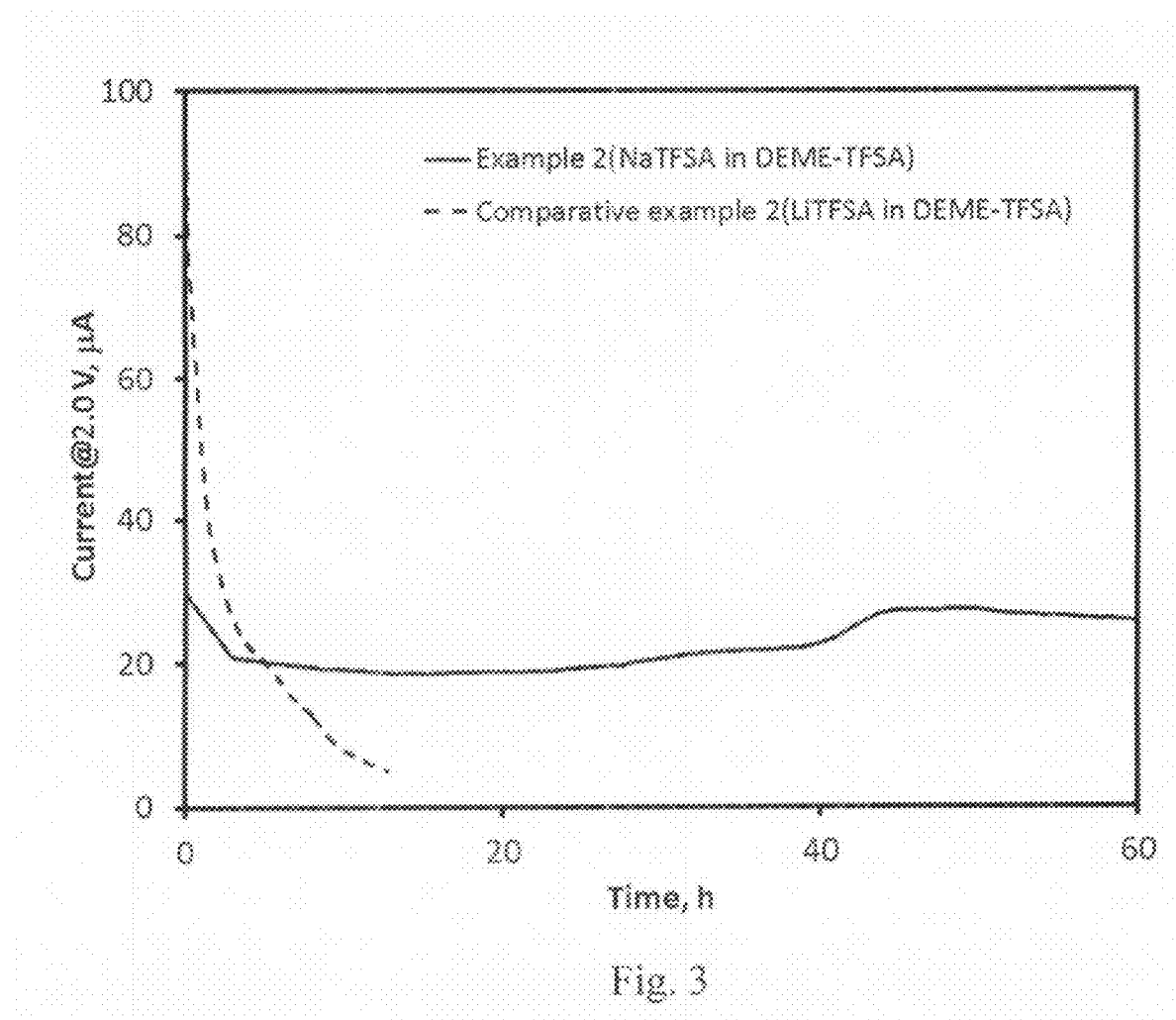
FIG. 3 shows the Discharge curves of Example 2 and Comparative example 2 (opened air supply).

FIG. 3 shows the Discharge curves of Example 2 and Comparative example 2 (opened air supply) that were obtained.

The discharge ran at constant current and constant voltage (CC-CV) mode with 100 mA up to the offset potential of 2.0 V vs. Li and the cut-off current of 5 mA. This figure showed clear evidence that Example 2 has larger capacity and rate capability than Comparative example 2 in opened ambient air supply condition.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A lithium-air battery, comprising:
   an anode compartment;
   a cathode compartment supplied with an $O_2$ source; and
   a lithium ion conductive membrane separating the anode compartment from the cathode compartment; wherein
   the anode compartment comprises an anode having lithium or a lithium alloy as active metal and a lithium ion electrolyte,
   the cathode compartment comprises an air electrode and a sodium ion electrolyte, and
   the lithium ion conductive membrane is not permeable to sodium ions.

2. The lithium air battery of claim 1, wherein the cathode compartment comprises an ionic liquid.

3. The lithium air battery of claim 2, wherein the ionic liquid is an imidazolium cation, a piperidinium cation, a pyrrolidinium cation or an ammonium cation associated with an anion selected from the group consisting of a bis(trifluoromethansulfonyl)imide anion, a bis(fluorosulfonyl)imide anion, a tetrafluoroborate anion and a hexafluorophosphate anion.

4. The lithium air battery of claim 2, wherein the ionic liquid is N,N-diethyl-N-methyl-N-(2-methoxyethyl)ammonium-bis(trifluoromethylsulfonyl)amide (DEME-TFSA), and the sodium ion electrolyte is sodium bis(trifluoromethylsulfonyl)amide (NaTFSA).

5. The lithium air battery of claim 1, wherein the ionic liquid further comprises a salt selected from the group consisting of a tetraalkyl ammonium salt, an imidazolium salt, a pyridinium salt and a piperidinium salt.

6. The lithium air battery of claim 1, wherein the lithium ion conductive membrane separating the anode compartment from the cathode compartment is a polymer, a ceramic material or a composite thereof.

7. The lithium air battery of claim 6, wherein
   the lithium ion conductive membrane comprises a ceramic membrane.

8. The lithium air battery of claim 7, wherein the dense ceramic membrane comprises one selected from the group consisting of a Li—La—Ti—O based perovskite, a Li—Al—Ti—P—O based NASICON, a Li—La—Zr—O based garnet, a Li—P—S based solid electrolyte and a Li—Ge—P—S based solid electrolyte.

9. The lithium air battery of claim 1, wherein the sodium ion electrolyte comprises a sodium salt selected from the group consisting of $Na_2SO_4$, $NaNO_3$, $NaClO_4$, $Na_3PO_4$, $Na_2CO_3$, $NaPF_6$ and NaOH.

10. The lithium air battery of claim 1, wherein the anode compartment further comprises a nonaqueous solvent selected from the group consisting of a cyclic carbonate, a chain carbonate, a cyclic ester, a cyclic ether and a chain ether.

11. The lithium air battery of claim 10, wherein the anode compartment further comprises a salt selected from the group consisting of $LiPF_6$, $LiClO_4$, $LiAsF_6$, $LiBF_4$, $LiN(CF_3SO_2)_2$, $Li(CF_3SO_3)$ and $LiN(C_2F_5SO_2)_2$.

12. The lithium air battery of claim 1, wherein the $O_2$ source supplied to the cathode compartment is one selected from the group consisting of pure $O_2$, ambient air and $O_2$ diluted with an inert gas.

13. The lithium air battery of claim 1, wherein the air electrode comprises at least one of a redox catalyst and a conductive material.

14. The lithium air battery of claim 1, wherein the air electrode comprises a redox catalyst and the redox catalyst is selected from the group consisting of $Li_2O$, $Na_2O$, $K_2O$, MgO, CaO, SrO, BaO), LiOH, NaOH, KOH, $Mg(OH)_2$, $Ca(OH)_2$, $Sr(OH)_2$, $Ba(OH)_2$), $Li_2CO_3$, $Na_2CO_3$, $K_2CO_3$, $MgCO_3$, $CaCO_3$, $SrCO_3$ and $BaCO_3$.

15. The lithium air battery of claim 14, wherein the air electrode further comprises a precious metal catalyst.

16. The lithium air battery of claim 1, wherein the air electrode comprises a conductive material and the conductive material is selected from the group consisting of Ketjen black, acetylene black, vapor grown carbon fiber, graphene, natural graphite, artificial graphite, activated carbon, a metal fiber, a metal powder and an organic conductive material.

17. A vehicle comprising the lithium air battery of claim 1.

18. The vehicle of claim 4, wherein the $O_2$ source supplied to the cathode compartment is ambient air.

* * * * *